US006934276B1

(12) United States Patent
Abrol et al.

(10) Patent No.: US 6,934,276 B1
(45) Date of Patent: Aug. 23, 2005

(54) METHODS FOR EFFICIENT EARLY PROTOCOL DETECTION

(75) Inventors: Nischal Abrol, San Diego, CA (US); Marcello Lioy, San Diego, CA (US)

(73) Assignee: Qualcomm Inc, San Diego, CA (US)

( * ) Notice: Subject to any disclaimer, the term of this patent is extended or adjusted under 35 U.S.C. 154(b) by 0 days.

(21) Appl. No.: 09/828,623

(22) Filed: Sep. 8, 1999

(51) Int. Cl.[7] .............................. H04J 3/24; H04L 12/28
(52) U.S. Cl. ...................... 370/349; 370/392; 370/474
(58) Field of Search ............................... 370/349, 392, 370/466, 469, 471, 474, 476; 709/220–222, 709/228, 230

(56) References Cited

U.S. PATENT DOCUMENTS

| | | | | |
|---|---|---|---|---|
| 5,666,362 A | * | 9/1997 | Chen et al. ................. | 370/420 |
| 5,835,036 A | * | 11/1998 | Takefman .................... | 341/95 |
| 5,978,386 A | * | 11/1999 | Hamalainen et al. ....... | 370/466 |
| 6,483,822 B1 | * | 11/2002 | Lioy et al. .................. | 370/329 |
| 6,487,218 B1 | * | 11/2002 | Ludwig et al. ............. | 370/469 |
| 6,542,504 B1 | * | 4/2003 | Mahler et al. .............. | 370/392 |
| 6,567,404 B1 | * | 5/2003 | Wilford ....................... | 370/389 |
| 6,721,333 B1 | * | 4/2004 | Milton et al. ............... | 370/469 |

* cited by examiner

Primary Examiner—Andy Lee
(74) Attorney, Agent, or Firm—Philip Wadsworth; Charles D Brown; George C. Pappas

(57) ABSTRACT

A method and system that detects protocol and configuration messages in a PPP packet without having to unframe the entire packet. The method includes a communication device that receives a plurality data frames, wherein the communication device is capable of ascertaining the beginning of an information portion within the received frames. The communications device detects whether the information portion contains configuration information, such as protocol and configuration messages of a predetermined type. In a first embodiment, the detection is achieved by the communication device unescaping the contents of a plurality of bytes and determining whether the escaped bytes contains the desired configuration information. In a second embodiment, the communication device determines whether the contents of a particular byte contain the desired configuration information, in escaped or unescaped form, and the communication device continues to sequentially process the bytes within the information portion until the bytes typically containing the desired configuration information are processed.

9 Claims, 6 Drawing Sheets

METHODS FOR EFFICIENT EARLY PROTOCOL DETECTION

BACKGROUND OF THE INVENTION

1. Field of the Invention

This invention generally relates to the field of wireless communications. More particularly, the present invention relates to a novel method and system for performing early protocol and configuration message detection without having to unframe entire PPP packets.

2. Description of Related Art

Recent innovations in wireless communication and computer-related technologies, as well as the unprecedented growth of Internet subscribers, have paved the way for mobile computing. In fact, the popularity of mobile computing has placed greater demands on the current Internet infrastructure to provide mobile users with more support. A crucial part of meeting these demands and providing users with the necessary support is the use of Code Division Multiple Access (CDMA) technology in wireless communication systems.

CDMA is a digital radio-frequency (RF) channelization technique defined in the Telecommunications Industry Association/Electronics Industries Association Interim Standard-95(TIA/EIA IS-95), entitled "MOBILE STATION-BASE STATION COMPATIBILITY STANDARD FOR DUAL-MODE WIDEBAND SPREAD SPECTRUM CELLULAR SYSTEM", published in July 1993 and herein incorporated by reference. Wireless communication systems employing this technology assign a unique code to communication signals and spread these communication signals across a common (wideband) spread spectrum bandwidth. As long as the receiving apparatus in a CDMA system has the correct code, it can successfully detect and select its communication signal from the other signals concurrently transmitted over the same frequency band. The use of CDMA produces an increase in system traffic capacity, improves overall call quality and noise reduction, and provides a reliable transport mechanism for data service traffic.

FIG. 1 illustrates the basic elements of such a wireless data communication system 100. Artisans of ordinary skill will readily appreciate that these elements, or their interfaces, may be modified, augmented, or subjected to various standards known in the art, without limiting their scope or function. System 100 allows a mobile terminal equipment, TE2 device 102 (e.g., the terminal equipment such as laptop or palmtop computer) to communicate with an Interworking Function (IWF) 108. System 100 includes a wireless communication device, MT2 device 104 (e.g., wireless telephone), and a Base Station/Mobile Switching Center (BS/MSC) 106. The IWF 108 serves as a gateway between the wireless network and other networks, such as the Public Switched Telephone Network or wireline packet data networks providing Internet- or Intranet-based access.

As shown in FIG. 1, the IWF 108 is coupled to the BS/MSC 106, via the L interface. Often the IWF 108 will be co-located with the BS/MSC 106. The TE2 device 102 is electronically coupled to the MT2 device 104 via the $R_m$ interface. The MT2 device 104 communicates with the BS/MSC 106 via the wireless interface $U_m$. The TE2 device 102 and the MT2 device 104 may be integrated into a single unit or may be separated out, as in the case of an installed mobile phone unit in which a laptop is the TE2 device 102 and the transceiver is the MT2 device 104. It is important to note that, as indicated by FIG. 2, the combination of the TE2 device 102 and the MT2 device 104, whether integrated or separate, is generally referred to as a mobile station (MS) 103.

Other support is made possible by applying various well-known protocols to control, manage, or otherwise facilitate different aspects of wireless communications. For example, the life-blood of the Internet infrastructure, the Internet Protocol (IP), has been incorporated in wireless communications to accommodate packet-oriented services. The IP protocol specifies the addressing and routing of packets (datagrams) between host computers and is defined in Request For Comment 791 (RFC 791) entitled, "INTERNET PROTOCOL DARPA INTERNET PROGRAM PROTOCOL SPECIFICATION," published September 1981, and herein incorporated by reference.

The IP protocol is a network layer protocol that encapsulates data into IP packets for transmission. Addressing information is affixed to the header of the packet. IP headers (e.g., IP version 4) contain 32-bit addresses that identify the sending and receiving hosts. These addresses are used by intermediate routers to select a path through the network for the packet towards its ultimate destination at the intended address. Thus, the IP protocol allows packets originating at any Internet node in the world to be routed to any other Internet node in the world, given that the originating party knows the IP address of the destination party.

Another well known protocol which has been incorporated in wireless communications systems is the Point-to-Point Protocol (PPP) protocol, which provides, inter alia, Internet access. The PPP protocol is described in detail in Request for Comments 1661 (RFC 1661), entitled "THE POINT-TO-POINT PROTOCOL (PPP)", published July 1994 and herein incorporated by reference.

Essentially, the PPP protocol specifies a method for transporting multi-protocol datagrams over point-to-point links and contains three main components: a method of encapsulating multi-protocol datagrams over serial links; a Link Control Protocol (LCP) for establishing, testing, configuring, and maintaining a data link connection; and a family of Network Control Protocols (NCPs) for establishing and configuring different network-layer protocols.

In an effort to provide a host of services on wireless communication systems, various standards have been developed to accommodate the wireless data transmission between the TE2 device 102 and the IWF 108. For example, the TIA/EIA IS-707.5 standard, entitled "DATA SERVICE OPTIONS FOR WIDEBAND SPREAD SPECTRUM SYSTEMS: PACKET DATA SERVICES," published February 1998, and herein incorporated by reference, defines requirements for support of packet data transmission capability on TIA/EIA IS-95 systems and specifies a suite of packet data bearer services. Similarly, the TIA/EIA IS-707-A.5 standard, entitled "DATA SERVICE OPTIONS FOR SPREAD SPECTRUM SYSTEMS: PACKET DATA SERVICES," and the TIA/EIA IS-707-A.9 standard, entitled "DATA SERVICE OPTIONS FOR SPREAD SPECTRUM SYSTEMS: HIGH-SPEED PACKET DATA SERVICES," both published in March 1999 and incorporated by reference, also define requirements for packet data transmission support on TIA/EIA IS-95 systems.

These standards provide that certain packet data service options that may be used to communicate between the TE2 device 102 and IWF 108 via BS/MSC 106. In doing so, IS-707.5 introduces the Network Model, which details the packet data protocol requirements for the $R_m$ interface, $U_m$ interface, and the L interface. Under this model, two separate PPP links are provided at the data link layer: a first PPP link (PPP$_R$) provides the data link layer between the TE2 device 102 and the MT2 device 104 (i.e., across the R$_m$ interface), and a second PPP link (PPP$_U$) independent of the first, provides the data link layer between the MT2 device 104 and the IWF 108 (i.e., across the U$_m$ and L interfaces).

The separate and independent PPP links help support "transparent mobility"; that is, the TE2 device 102 should experience seamless and transparent service, regardless of time and its current IWF 108 point-of-attachment. As such, the TE2 device 102 should not be affected by location changes. For example, the TE2 device 102 should not be affected from PPP renegotiations occurring on the U$_m$ link, such as when MT2 device 104 attempts to attach to a different IWF 108. Thus, the Network Model operates to isolate the PPP$_R$ link from the PPP$_U$ link in order to prevent changes on the U$_m$ link from affecting the R$_m$ link. In other words, the PPP$_U$ link can be renegotiated without forcing the PPP$_R$ link to be renegotiated.

FIG. 2 illustrates the protocol stacks in each entity of the IS-707.5 Network Model. At the far left of FIG. 2 is a protocol stack, shown in conventional vertical format, depicting the protocol layers running on the TE2 device 102 (e.g., the mobile terminal, laptop or palmtop computer). The TE2 device 104 protocol stack is illustrated as being logically connected to the MT2 device 104 protocol stack over the R$_m$ interface. The MT2 device 104, is illustrated as being logically connected to the BS/MSC 106 protocol stack over the U$_m$ interface. The BS/MSC 106 protocol stack is, in turn, shown as being logically connected to the IWF 108 protocol stack over the L interface.

By way of example, the protocols depicted in FIG. 2, operate as follows: the PPP$_R$ protocol 208 on the TE2 102 device encodes packets from the upper layer protocols 204, and the network layer IP protocol 206. The PPP$_R$ protocol 208 then transmits the packets across the R$_m$ interface using the TIA/EIA 232-F protocol 210 to the TIA/EIA-232-F-compatible port on the MT2 device 104 running the TIA/EIA 232-F protocol 212. The TIA/EIA-232-F standard is defined in "INTERFACE BETWEEN DATA TERMINAL EQUIPMENT AND DATA CIRCUIT-TERMINATING EQUIPMENT EMPLOYING SERIAL BINARY DATA INTERCHANGE", published in October 1997 and herein incorporated by reference. It is to be understood that other standards or protocols known to artisans of ordinary skill in the art may be used to define the transmission across the R$_m$ interface. For example, other applicable R$_m$ interface standards include, the "UNIVERSAL SERIAL BUS (USB) SPECIFICATION, Revision 1.1", published in September 1998, and the "BLUETOOTH SPECIFICATION VERSION 1.0A CORE, published in July 1999, both incorporated by reference.

The TIA/EIA 232-F protocol 212 on the MT2 device 104 receives the packets from the TE2 device 102 and passes them to the PPP$_R$ protocol 213. As stated above, the PPP$_R$ protocol 213 unframes the packets encapsulated in the PPP frames and typically, when a data connection is up, the protocol 213 transfers the packets to PPP$_U$ protocol 217. Protocol 217 essentially re-frames the packets for transmission to a PPP$_U$ peer located in the IWF 108. The Radio Link Protocol (RLP) 216 and IS-95 protocol 214, both of which are well known in the art, are used to transmit the packet-encapsulated PPP frames to the BS/MSC 106 over the U$_m$ interface. The RLP protocol 216 is defined in the IS-707.2 standard, entitled "DATA SERVICE OPTIONS FOR WIDEBAND SPREAD SPECTRUM SYSTEMS: RADIO LINK PROTOCOL", published in February 1998 and herein incorporated by reference, as well as the IS-707-A.2 standard, entitled "DATA SERVICE OPTIONS FOR SPREAD SPECTRUM SYSTEMS: RADIO LINK PROTOCOL", published in March 1999 and also incorporated by reference.

A corresponding RLP protocol 220 and IS-95 protocol 222 in the BS/MSC 106 transfer the packets to the relay layer protocol 224 for transmission across the L interface to the relay layer protocol 224 on the IWF 108. The PPP$_U$ protocol 232 then unframes the received packets and transfers them to the network layer protocol IP 230, which in turn passes them to the upper layer protocols 228 or forwards them to the Internet.

As stated above, the PPP$_R$ protocol 213 transfers the packets to the PPP$_U$ protocol 217 when a data link connection is established. RFC 1661 provides that Link Control Protocol (LCP) packets must be exchanged and negotiated over each PPP link (i.e., PPP$_R$ and PPP$_U$) in order to establish, configure, and test the data link connection. As such, these LCP packets comprise Configure-Request, Configure-Ack, Configure-Nak, Protocol-Reject, and Configure-Reject messages to negotiate various options and operate as follows: the Configure-Request packet is used to negotiate configuration options. The Configuration-Ack packet is only transmitted if every configuration option in a received Configuration-Request packet is recognizable and all values are acceptable. The Configure-Nak packet is sent when the requested configuration options in a Configuration-Request packet are recognizable but contain values that are not acceptable and the Configure-Nak Options field is filled with the unacceptable Configure-Request configuration options and suggested values that will work. The Configure-Reject packet is sent when the requested configuration options in a Configure-Request includes configuration options that are not understood by the receiver and the Configure-Reject Options field contains the unrecognized Configure-Request configuration options.

Once the LCP packets are exchanged, the link options negotiated, and the data link connection established, a network layer connection must be established between the TE2 device 102 and the IWF 108. Such a connection is achieved through protocols 206, 212, 218, 230, which include, for example, the IP protocol. The negotiating, configuring, enabling, and disabling of the IP protocol on both ends of the PPP links is provided by the Internet Protocol Control Protocol (IPCP). IPCP is a part of a family of Network Control Protocols (NCPs) included in the PPP protocol and is described in Request for Comment (RFC) 1332, "THE PPP INTERNET PROTOCOL CONTROL PROTOCOL (IPCP)", published in May 1992 and herein incorporated by reference.

The IPCP protocol uses the same configuration option negotiation mechanism as the LCP protocol and, much like the LCP protocol, IPCP negotiations occur separately for both the R$_m$ interface and the U$_m$ interface. As described in RFC 1661, the Configuration-Ack packet contains a list of the options, which the Sender is acknowledging. The MT2 device 104 monitors the received and transmitted Configuration-Ack packets over the R$_m$ and U$_m$ interfaces and stores the value of each option in a storage device, such as a computer memory. All configuration options have default values, defined by RFC 1661, which are used when the corresponding configuration option is not negotiated. It is to be noted that the configuration option default values may be defined by other RFCs, such as, for example, RFC 1877 entitled "PPP Internet Protocol Control Protocol Extensions for Name Server Addresses" published in December 1995 and incorporated by reference.

As stated above with respect to the Network Model, the $PPP_U$ link can be renegotiated without forcing the $PPP_R$ link to be renegotiated. To maintain such isolation between the $R_m$ and $U_m$ interfaces, the MT2 device 104 generally unframes and reframes received PPP packets. Unless packets received by the MT2 device 104 are to be passed to an executing upper layer protocol within the MT2 device 104, the PPP packets are unframed only to be reframed for subsequent transmission to a PPP peer protocol. This unframing/reframing occurs even when the packets require no further processing in the MT2 device 104. For example, when a call is initially brought up, the LCP and IPCP mechanisms can negotiate to establish identical configuration options for both the $U_m$ and $R_m$ interfaces. As long as the configuration options remain identical, all of the PPP data packets (as opposed to the configuration packets) could "pass through", from one interface to the other, without the MT2 device 104 unframing/reframing the packets. Clearly, in cases where the configuration options remain identical, the MT2 device 104 performs too many unnecessary PPP packet unframing/reframing operations. Such operations adversely affect the processing resources and throughput latency of the MT2 device 104.

However, if the configuration options change, they must be renegotiated, which militates in favor of unframing/reframing the PPP packets. For example, by virtue of the fact that the MT2 device 104 is mobile, it is capable of moving to an area that is served by an IWF 108 that is different from the original IWF 108. When this happens, the MT2 device 104 will be "handed off" to the new IWF 108 for service. This handoff requires the renegotiation of particular LCP and IPCP configuration options over the $U_m$ interface as well as the intervention of the MT2 device 104. If the packets containing the configuration option messages (e.g., Configure-Request, Configure-Ack, Configure-Nak, etc.) were simply "passed through", without unframing or examining the contents of the packets, the packets would force the end-to-end resynchronization of the entire link which would terminate the independence of the $R_m$ and $U_m$ links. Therefore, what is needed is a novel and efficient method and system capable of early protocol and configuration message detection without having to unframe a PPP packet.

SUMMARY OF THE INVENTION

The present invention addresses the need identified above by providing a method and system that detects protocol and configuration messages in a PPP packet without having to unframe the entire packet.

Methods and systems consistent with the principles of the present invention as embodied and broadly described herein include a communication device that receives a plurality data frames, wherein the communication device is capable of ascertaining the beginning of an information portion within the received frames. The communications device detects whether the information portion contains configuration information, such as protocol and configuration messages of a predetermined type. In a first embodiment, the detection is achieved by the communication device unescaping the contents of a plurality of bytes and determining whether the escaped bytes contains the desired configuration information. In a second embodiment, the communication device determines whether the contents of a particular byte contain the desired configuration information, in escaped or unescaped form, and the communication device continues to sequentially process the bytes within the information portion until the bytes typically containing the desired configuration information are processed or it is determined that the information does not exist.

BRIEF DESCRIPTION OF THE DRAWINGS

The accompanying drawings, which are incorporated in and constitute a part of this Specification, illustrate an embodiment of the invention and, together with the description, explain the objects, advantages, and principles of the invention. In the drawings.

DETAILED DESCRIPTION OF THE PREFERRED EMBODIMENTS

The following detailed description of the embodiments of the present invention refers to the accompanying drawings that illustrate these. Other embodiments are possible and modifications may be made to the embodiments without departing from the spirit and scope of the invention. Therefore, the following detailed description is not meant to limit the invention. Rather the scope of the invention is defined by the appended claims.

It will be apparent to one of ordinary skill in the art that an embodiment of the present invention, as described below, may be realized in a variety of implementations, including the software, firmware, and hardware of the entities illustrated in the figures (i.e., TE2 device 102, MT2 device 104, BS/MSC 106 and IWF 108). The actual software code or control hardware used to implement the present invention is not limiting of the present invention. Thus, the operation and behavior of the present invention will be described without specific reference to the actual software code or hardware components. Such non-specific references are acceptable because it is clearly understood that a person of ordinary skill in the art would be able to design software and control hardware to implement the embodiment of the present invention based on the description herein.

Figure 5:
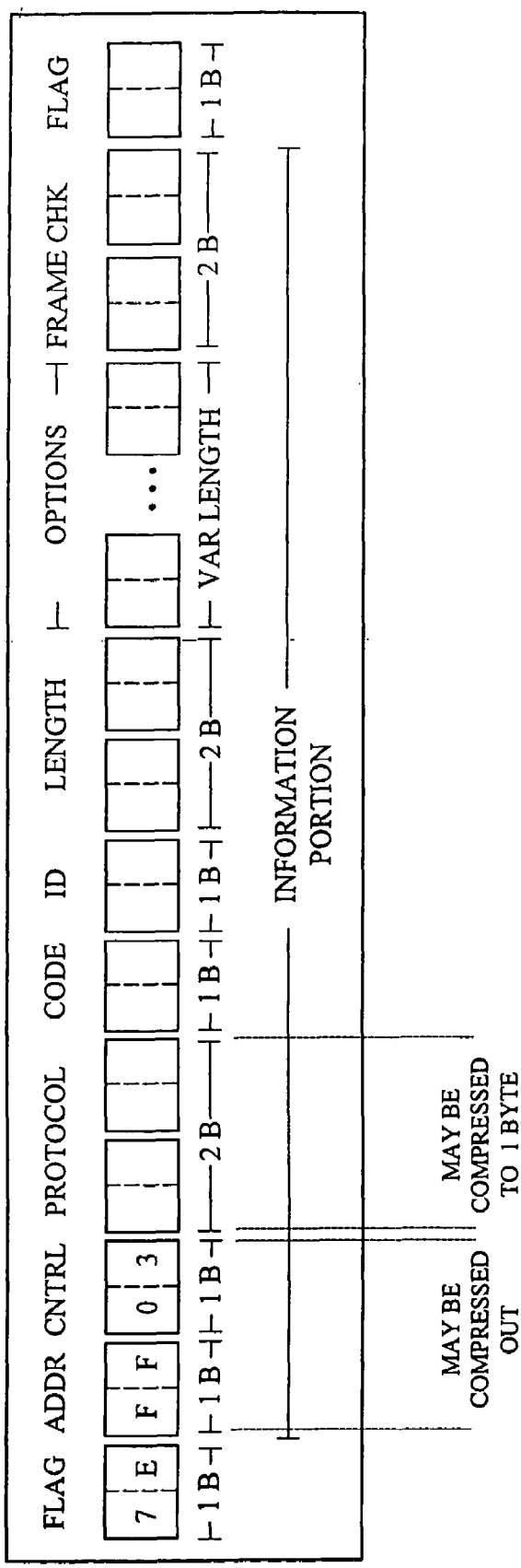
FIG. 5 describes the general format of a packet encapsulated in a PPP frame.

Because the embodiments described herein operate on PPP packets encapsulated in HDLC frames, FIG. 5 illustrates the various attributes of such packets. The beginning (and end) of the frame is demarcated by a 1-byte framing flag represented by the hexadecimal character "7E". The following two bytes indicate the protocol address and control field which, for standard PPP packets, are typically designated as the hexadecimal characters "FF" and "03", respectively. The next two bytes indicate the protocol type, such as, for example, the LCP protocol, denoted by the hexadecimal characters "C0" and "21"; the IPCP protocol, indicated by the hexadecimal characters "80" and "21"; or the Van Jacobson protocol compressed state, indicated by the hexadecimal characters "00" (which may be compressed out) and "2D". The subsequent byte indicates the code or the configuration message, such as Configure-Request, denoted by the hexadecimal character "01"; Configure-Ack, indicated by the hexadecimal character "02"; or Configure-Nak, indicated by the hexadecimal character "03".

1. First Embodiment

Figure 1:
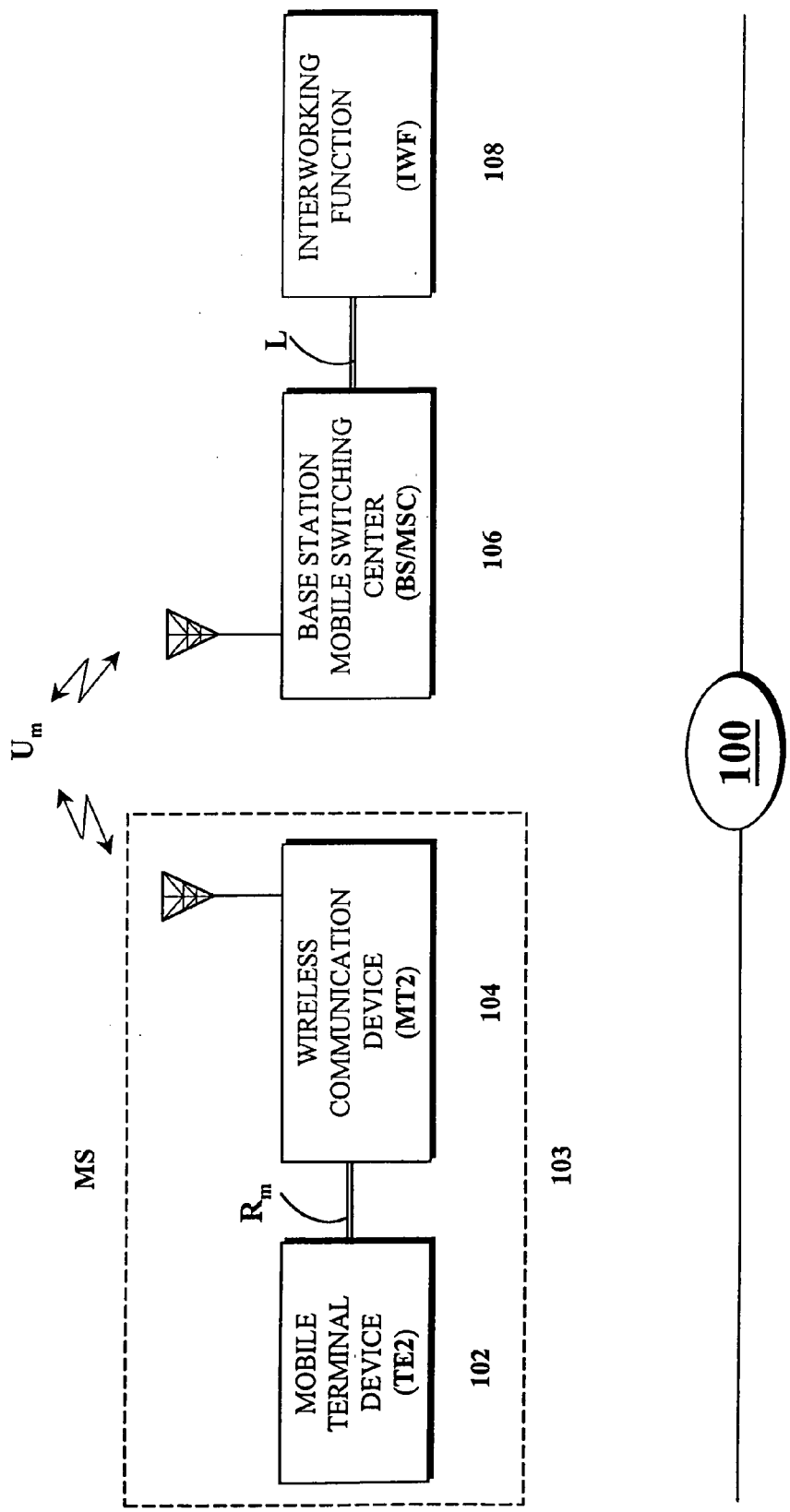
FIG. 1 is a high level block diagram depicting various elements of a wireless communication system.
Figure 2:
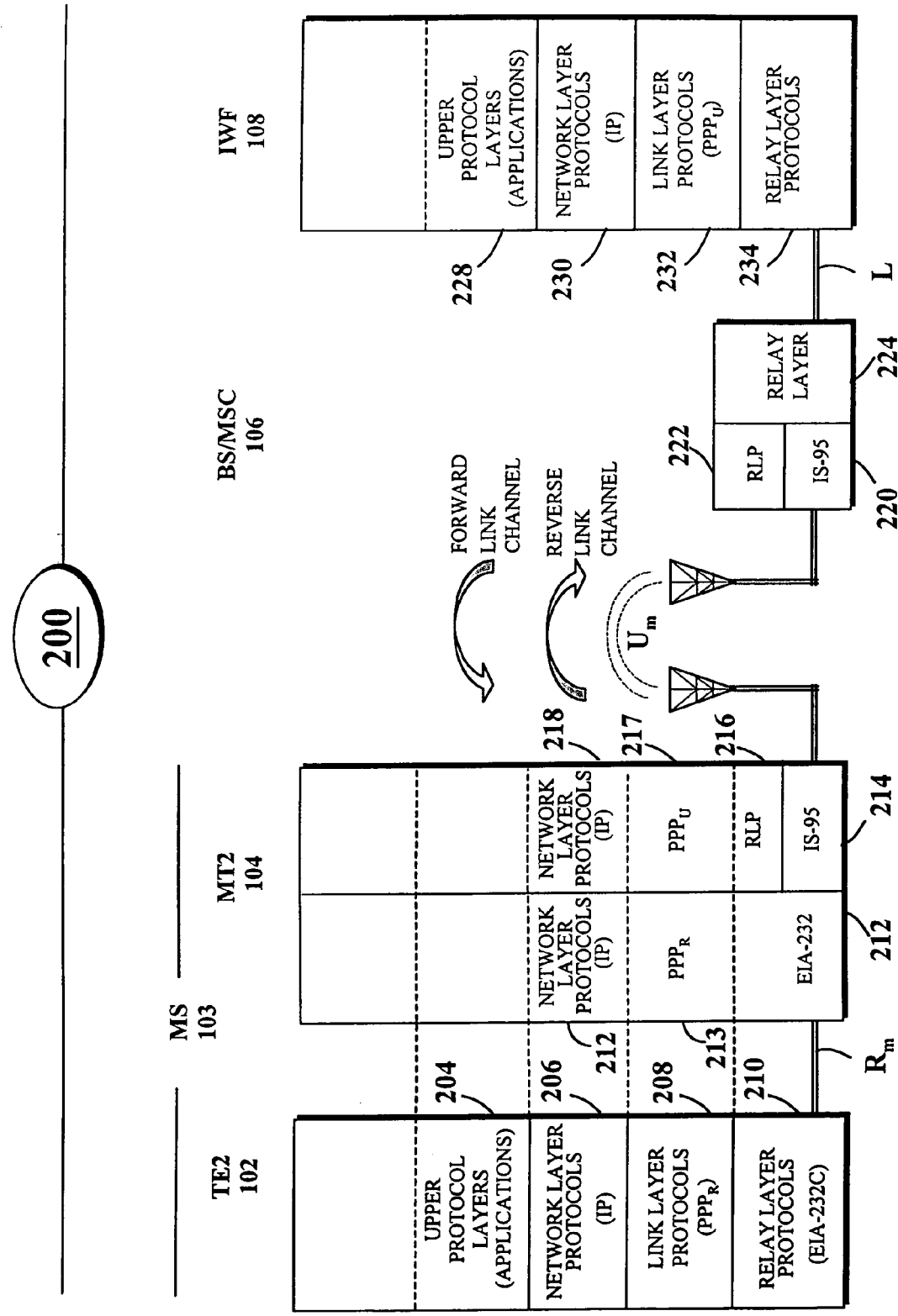
FIG. 2 schematically describes the protocol stacks of a wireless communication system.
Figure 3:
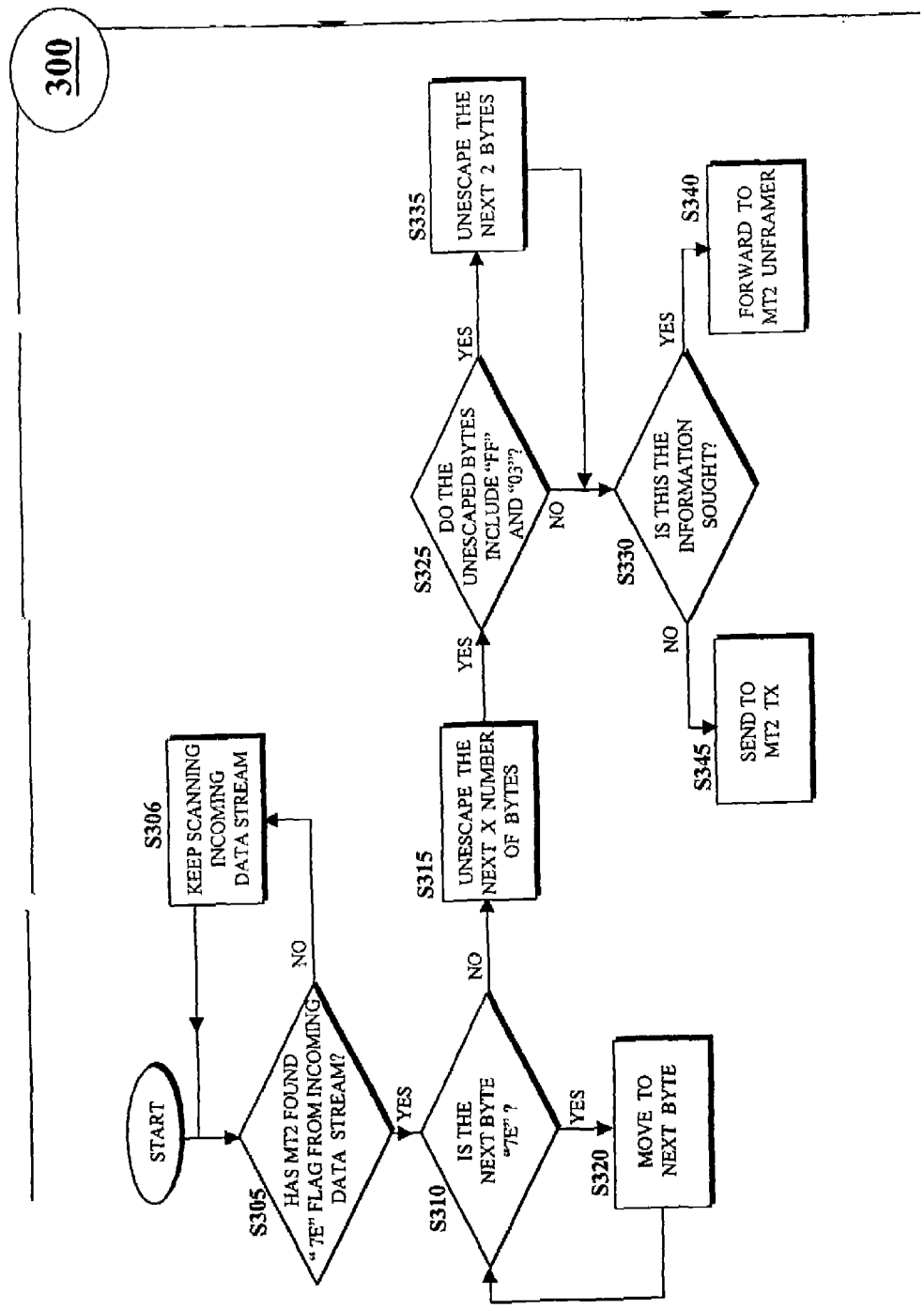
FIG. 3 is a flow-chart diagrams describing a first embodiment of the invention.

FIG. 3 is a flow-chart diagram depicting a first embodiment of the present invention. As such, FIG. 3 details the operation of the MT2 device 104 for performing early protocol and configuration message detection in PPP packets.

In step S305, the MT2 device 104, first scans an incoming data stream to detect the framing flag, indicated by the hexadecimal character "7E". This flag demarcates a frame and can, therefore, be used to indicate the beginning and/or end of packets encapsulated in PPP frames. If the MT2 device 104 has not detected a "7E" framing flag, it keeps scanning the incoming data, as indicated by step S306, until it detects the flag. Once the MT2 device 104 detects the "7E" framing flag, it progresses to step S310.

After detecting a "7E" flag, the MT2 device 104, in step S310, determines whether the next byte is also a "7E" flag. If so, the MT2 device 104 skips that particular byte, as indicated in step S320, and returns back to step S310 to apply the "7E" flag test to the next byte. If the next byte is not a "7E" flag, the MT2 device 104 progresses to step S315. It is important to note that the incoming data stream may contain consecutive "7E" flags, as in the case of back-to-back packets where a "7E" flag, indicating the end of a frame, is juxtaposed to a subsequent "7E" flag, indicating the beginning of a new frame. Steps S310 and S320 operate to filter out the framing flags, enabling the MT2 device 104 to discern where the information portion of the framed packet begins.

Aware that the next byte is not a "7E" flag, but an information byte, the MT2 device 104 in step S315, "unescapes" the next X number of bytes, where X corresponds to the relative position of the information sought within the framed-packet. This unescaping is performed because, as is well known in the art, when the PPP protocol is transmitted with asynchronous, HDLC-like framing (i.e., as per RFC 1662), the protocol employs an "escaping technique" to mask certain characters within the information portion of a packet that also function as special control characters. Such characters include the aforementioned "7E" flag as well as the escape flag "7D". When these characters are encountered in the information portion of a framed-packet, the escaping technique stuffs the escape flag "7D" in front of the character and modifies the character in order to neutralize its control function. Therefore, in seeking to detect certain protocol or configuration information from an incoming data stream, the MT2 device 104, in step S315, unescapes the number of bytes necessary to access the information sought in order to uncover its true identity. After unescaping X bytes, the MT2 device 104 proceeds to step S325.

In step S325, the MT2 device 104 determines whether the unescaped X bytes include the standard PPP address and control field characters "FF" and "03", respectively. Although these characters typically comprise the first and second bytes of the information portion of a PPP packet (see, e.g., FIG. 5), these characters may be compressed out of the packet, thereby affecting the location of the ensuing information bytes. Therefore, the MT2 device 104 must check whether these characters are included within the unescaped bytes of the packet in order to make the necessary adjustments later. If the characters "FF" and "03" are not included in the unescaped bytes (i.e., characters "FF" and "03" are compressed out), the MT2 device 104 in step S330, checks to see whether these bytes contain the protocol or configuration message information being sought. If they do, then the MT2 device 104, in step S340, forwards the entire packet to the MT2 device 104 unframer, in order to unframe the packet and engage in the processing indicated by the detected information. If the bytes do not contain the information being sought, the MT2 device 104 sends the entire packet to the MT2 device 104 transmit portion to be forwarded across the pertinent interface, as indicated by step S345.

Returning to step S325, if the unescaped X bytes include "FF" and "03", the MT2 device 104, in step S335, compensates by unescaping another 2 bytes, in addition to the specified X bytes. This adjusts for the inclusion of the "FF" and "03" characters within the X bytes. The MT2 device 104 then submits the X+2 unescaped bytes to step S330, where, as stated above, it checks to see whether the unescaped bytes contain the desired information. If they do, then the MT2 device 104, in step S340, forwards the entire packet to the MT2 device 104 unframer. If the bytes do not contain the protocol or configuration message information being sought, the MT2 device 104, in step S345, sends the entire packet to the MT2 device 104 transmit portion to forward the packet across the pertinent interface.

To illustrate the operation of this embodiment, suppose the early detection of an LCP protocol packet is desired. The LCP protocol specification is provided within the protocol information portion of a PPP-framed packet. As indicated in FIG. 5, the protocol information is 2 bytes long, typically occupying byte positions 3 and 4 of the information portion of a standard PPP-framed packet. After scanning the incoming data stream and discerning where the information bytes begin (i.e., steps S305, S310, and S320), the MT2 device 104 unescapes the next two bytes (i.e., X equal to 2), as indicated by step S315. If, in step S325, the first 2 bytes do not include the "FF" and "03" characters, then the MT2 device 104 checks to see whether these bytes contain the LCP information being sought. If it does, then the MT2 device 104, in step S340, forwards the entire packet to the MT2 device 104 unframer, in order to unframe the packet and engage in the processing required by the LCP protocol information. If the bytes do not contain the LCP information, the MT2 device 104 sends the entire packet to the MT2 device 104 transmit portion to be forwarded across the pertinent interface, as indicated by step S345.

If, on the other hand, the first two bytes of the unescaped X bytes are "FF" and "03", the MT2 device 104, in step S335, compensates by unescaping the next 2 bytes, in addition to the first two bytes. The MT2 device 104 then submits all four unescaped bytes to step S330, where, as stated above, it checks to see whether these bytes contain the LCP information being sought. If they do, then the MT2 device 104, in step S340, forwards the entire packet to the MT2 device 104 unframer. If the bytes do not contain the LCP information, the MT2 device 104, in step S345, sends the entire packet to the MT2 device 104 transmit portion.

It is important to note that, by virtue of the embodiment described above, all of the header information contained within the PPP-framed packet can be detected without unframing the entire packet. For example, by simply adjusting the X value in step S315, this embodiment can detect such PPP information as protocol information, configuration messages, packet ID, etc.

Thus, this embodiment detects protocol and configuration messages within a PPP packet stream without having to unframe the entire packets. Rather, by unescaping certain bytes within the information portion of the packets, this embodiment provides a system and method that efficiently detects protocol and configuration messages without performing unnecessary PPP packet unframing/reframing operations.

2. Second Embodiment

Figure 4A:
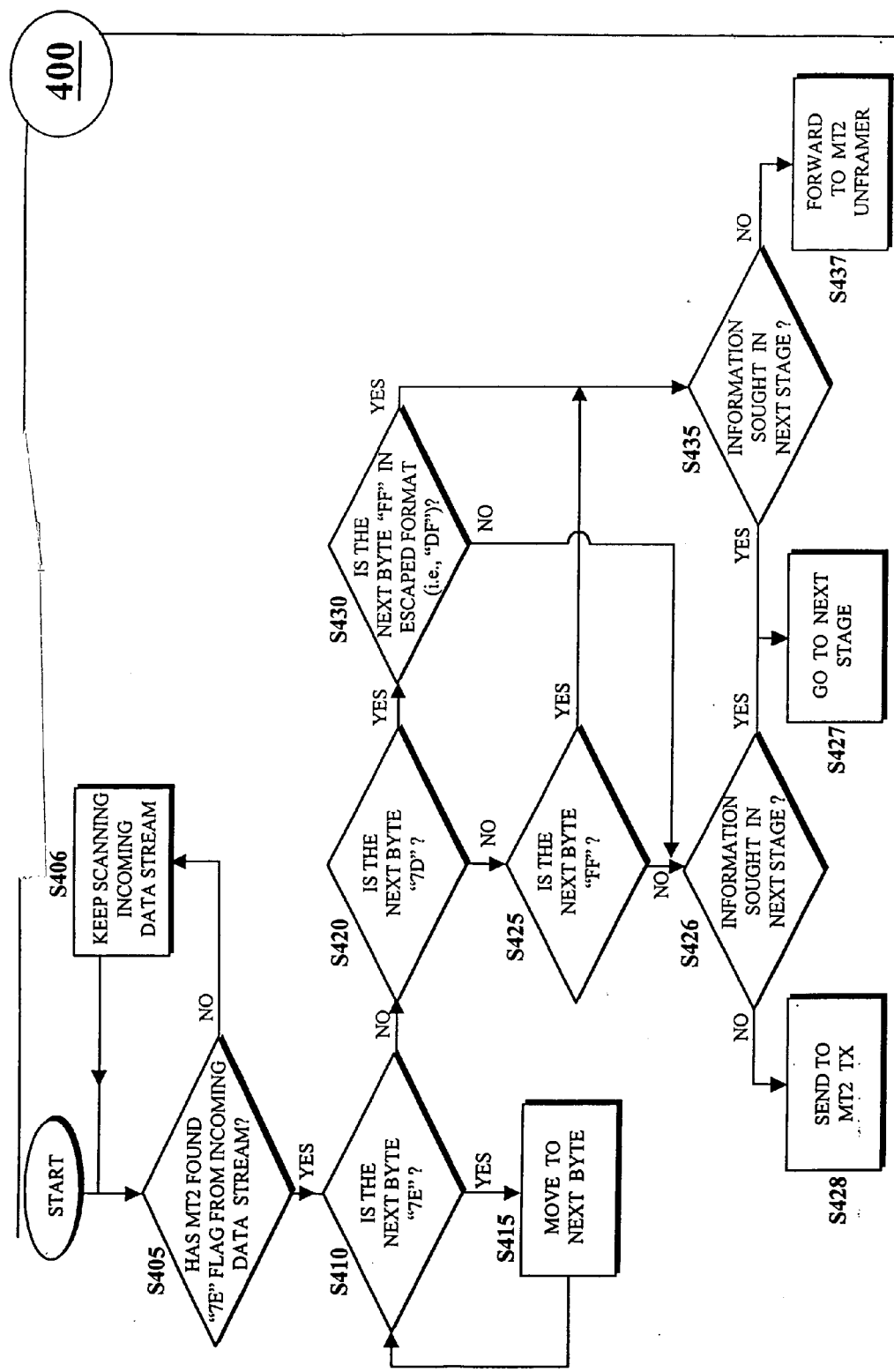
FIGS. 4A, 4B are flow-chart diagrams describing a second embodiment of the invention.
Figure 4B:
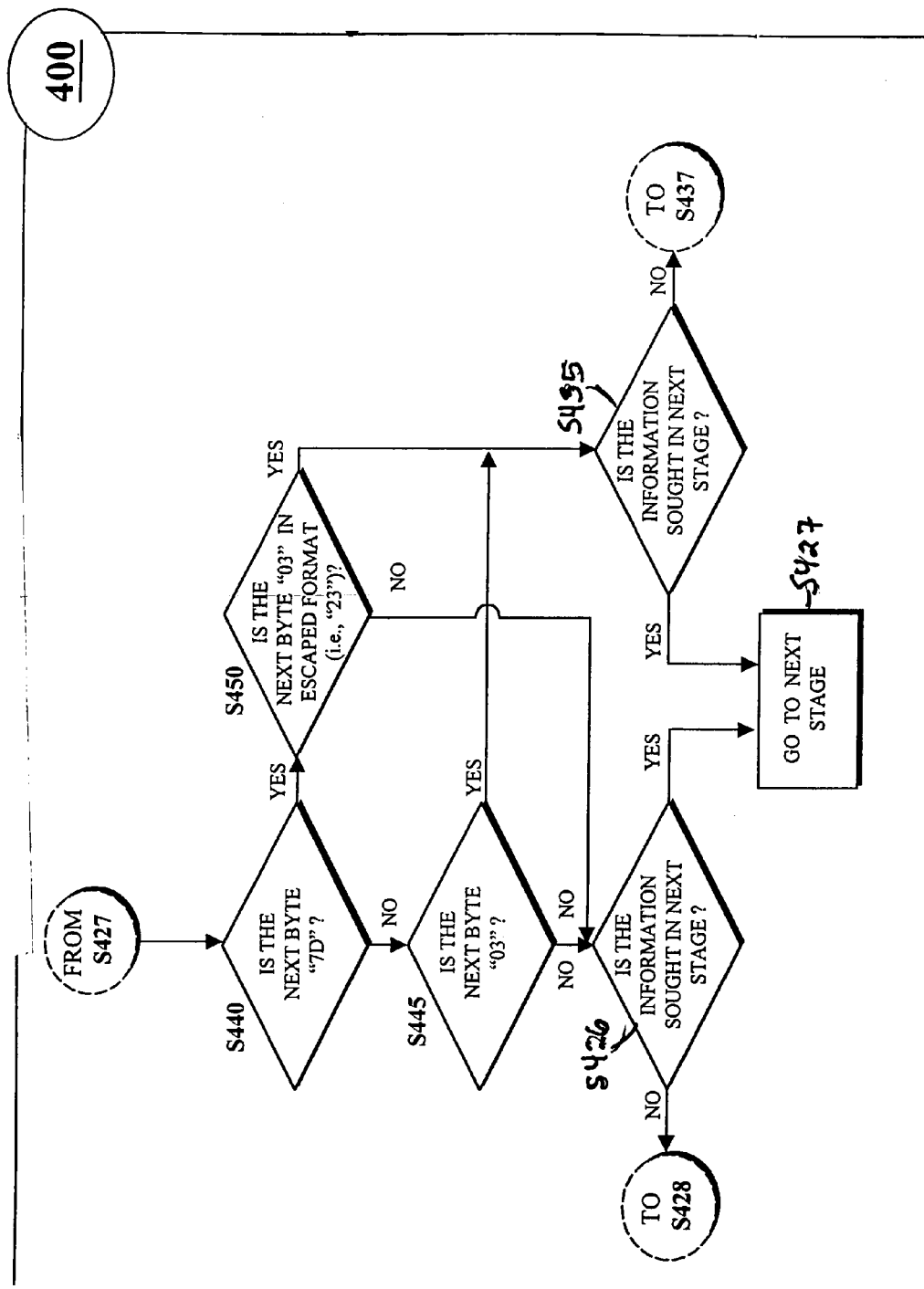

FIGS. 4A, 4B are flow-chart diagrams depicting a second embodiment of the present invention. This embodiment detects protocol and configuration messages contained within the information portion of a PPP-framed packet by scanning the incoming data stream and mechanically checking the information bytes in stages, without unframing the packets. Given the format of the PPP-framed packets, as illustrated by FIG. 5, the first stage specifically detects the content of the 1-byte address field, contained within the information portion of the packet. The second stage is directed to detecting the contents of the 1-byte control field, which follows the address field. Accordingly, this embodiment is capable of advancing the stages, and detecting the contents of all information fields, until the end of the information portion. For example, a third stage could be directed to detecting the contents of the 2-byte protocol field, which follow the control field. However, because of the PPP-framed packet structure and the sequential nature of this embodiment, information contained in the later fields of the frame, is generally detected after processing and detecting information contained in the preceding fields.

As a representative example of this embodiment, suppose the information sought is contained within the control field. To access this field and detect the pertinent information from an incoming data stream, the MT2 device 104 must first identify the beginning of the information portion of the PPP packet and then access and detect the information in the address field. Only after processing the address field information, is the MT2 device 104 ready to access and detect the control field information.

As such, FIG. 4A illustrates the first stage of this embodiment. In step S405, the MT2 device 104 first scans the incoming data stream to detect the framing flag "7E". After detecting the "7E" flag, the MT2 device 104, in step S410, determines whether the next byte is also a "7E" flag. If it is, the MT2 device 104 moves to the next byte, as indicated in step S415, and returns back to step S410 to apply the "7E" flag test to the next byte. If the next byte is not a "7E" flag, the MT2 device 104 progresses to step S420. As stated above with respect to the first embodiment, steps S410 and S415 operate to filter out the framing flags, allowing the MT2 device 104 to identify the beginning of the information portion of the PPP-framed packet.

Once the MT2 device 104 is able to identify the beginning information portion, it exploits the format of PPP packets to detect the information in stages. As stated above, the first stage of this embodiment is to detect the character "FF".

In step S420, the MT2 device 104 checks to see whether the first information byte is the escape character "7D". As indicated above, the escaping technique stuffs the escape flag "7D" in front of certain characters and masks them. If the first information byte is not "7D" (i.e., the first information byte is not escaped), the MT2 device 104, in step S425, checks to see if the first information byte is the "FF" character (i.e., in unescaped form). If it is, the MT2 device 104 proceeds to step S435. If first information byte is not the "FF" character, the MT2 device 104 determines, in step S426, whether there is more information within the framed-packet to be sought, and if there is, the MT2 device 104 moves onto the next stage in step S427. If there is no additional desired information, the MT2 device 104, in step S428, sends the entire packet to the MT2 device 104 transmit portion to forward the packet across the pertinent interface.

Returning to step S420, if the first information byte is "7D" (i.e., the first information byte is escaped), the MT2 device 104, in step S430, checks to see whether the next byte is the "FF" character in the escaped format (i.e., hexadecimal character "DF"). If it is, the MT2 device 104 proceeds to step S435. If the next byte is not the "DF" character, the MT2 device 104 proceeds to step S426 where, as stated above, the MT2 device 104 checks to see whether there is more desired information. If there is, the MT2 device 104 moves onto the next stage in step S427. If there is no additional desired information, the MT2 device 104, in step S428, sends the entire packet to the MT2 device 104 transmit portion to forward the packet across the pertinent interface.

If, in step S430, the next byte is the "FF" character in the escaped format (i.e., hexadecimal character "DF"), the MT2 device 104 proceeds to step S435, where it checks to see whether there is more information to be sought. If there is, the MT2 device 104 moves onto the next stage in step S427. If there is no additional desired information, the MT2 device 104, in step S437, forwards the entire packet to the MT2 device 104 unframer, in order to unframe the packet and engage in the processing indicated by the detected information.

After completing the first stage of the embodiment (i.e., the detection of the "FF" character in the protocol address field), the MT2 device 104 must, consistent with the object of the representative example, endeavor to detect the "03" character in the control field. As noted above, this detection is referred to as the second stage detection for this embodiment and is depicted in FIG. 4B.

Upon completing the first stage, as indicated by step S427, the MT2 device 104, in step S440, determines, once again, whether the next byte is the "7D" character. As stated above, this determination is used in case the characters within the relevant information field were escaped. If the next byte is not the "7D" character, the MT2 device 104, in step S445, determines whether the byte is the "03" character (i.e., in unescaped format). If it is, the MT2 device 104 progresses to step S435 where, as previously noted, the MT2 device 104 determines whether there is additional information being sought, and if there is the MT2 device 104 moves onto the next stage, as per step S427. Otherwise, the MT2 device 104, in step S428, forwards the entire packet to the MT2 device 104 transmit portion to forward the packet across the relevant interface.

Returning to step S440, if the MT2 device 104 determines that the following byte is the "7D" character, it checks to see, in step S450, whether the subsequent byte is the "03" character in the escaped format (i.e., hexadecimal character "23"). If the subsequent byte is not the "23" character, the MT2 device 104 proceeds to step S426, to determine whether to move onto the next stage, as in step S427, or send the entire packet to the MT2 device 104 transmit portion to forward the packet across the pertinent interface, as in step S428. If the subsequent byte is the "23" character, the MT2 device 104 proceeds to step S435 where it determines whether to move onto the next stage, as in step S427, or forward the entire packet to the MT2 device 104 unframer, as in step S437.

Thus, this embodiment detects protocol and configuration messages within a PPP packet stream without having to unframe the packets. Rather, this embodiment scans the incoming data stream and mechanically checks the information bytes in stages. These stages correspond to the information fields of the PPP-framed packets and, therefore, this embodiment detects the desired information sequentially without performing unnecessary PPP packet unframing/reframing operations and without ignoring messages affecting link configurations.

The foregoing description of preferred embodiments of the present invention provides illustration and description, but is not intended to be exhaustive or to limit the invention to the precise form disclosed.

Modifications and variations are possible consistent with the above teachings or maybe acquired from practice of the invention. Accordingly, the scope of the invention is defined by the claims and their equivalents

What is claimed:

1. In a communication device, a method of early detection of configuration information of a predetermined type, the method comprising:
   receiving a plurality of framed data packets, each of the framed data packets containing an information portion;
   detecting a beginning of the information portion within one of the framed data packets, the detecting including scanning the plurality of the framed data packets and establishing the beginning of the information portion for one of the framed data packets by identifying a frame-demarcating character;
   unescaping contents of a predetermined number of bytes within the information portion;
   identifying when the contents of the unescaped predetermined number of bytes includes predetermined characters;
   unescaping contents of additional consecutive bytes succeeding the predetermined number of bytes when the contents of the unescaped predetermined number of bytes includes the predetermined characters;
   identifying when contents of the unescaped predetermined number of bytes and contents of additional consecutive bytes contain the configuration information of a predetermined type; and
   when the configuration information is of a predetermined type, unframing the one of the framed data packets when the information portion contains the configuration information of a predetermined type.

2. In a communication device, a method of early detection of configuration information of a predetermined type, the method comprising:
   receiving a plurality of framed data packets, each of the framed data packets containing an information portion;
   detecting a beginning of the information portion within one of the framed data packets, the detecting involving scanning the plurality of the framed data packets and establishing the beginning of the information portion for one of the framed data packets by identifying a frame-demarcating character;
   identifying when contents of a particular byte or bytes of the information portion contains information of a type associated with the particular byte;
   identifying when the contents of the particular byte contains the configuration information of a predetermined type;
   unframing the one of the framed data packets when the information portion contains the configuration information of a predetermined type; and
   progressing to a subsequent stage when the contents of the particular byte lacks the configuration information of a predetermined type and the configuration information of a predetermined type is disposed in a byte position subsequent to the particular byte.

3. The method of claim 2, wherein the progressing to a subsequent stage further includes:
   examining contents of at least one succeeding byte of the information portion, the succeeding byte being subsequent to the particular byte;
   identifying when contents of the succeeding byte contains information of a type associated with the succeeding byte; and
   identifying when the contents of the succeeding byte contains the configuration information of a predetermined type and sequentially examining successive bytes of the information portion until contents of the succeeding byte contain the configuration information of a predetermined type.

4. The method of claim 3, wherein the contents of the particular byte and the contents of the succeeding byte includes escaped information.

5. The method of claim 3, wherein the contents of the particular byte and the contents of the succeeding byte includes unescaped information.

6. A system for early detection of configuration information of a predetermined type, the system including (i) a terminal device for transmitting and receiving a plurality of flamed data packets, each of the framed data packets containing an information portion, and (ii) a communication device coupled to the terminal device, the communication device being operable to:
   detect a beginning of the information portion within one of the framed data packets to identify when the information portion contains the configuration information of a predetermined type; and
   unframe the one of e framed data packets when the information portion contains the configuration information of a predetermined type;
   the detecting and unframing including:
      scanning the plurality of the framed data packets and establishing the beginning of the information portion for one of the framed data packets by identifying a frame-demarcating character;
      unescaping contents of a predetermined number of bytes within the information portion;
      identifying when the contents of the unescaped predetermined number of bytes includes predetermined characters;
      unescaping contents of additional consecutive bytes succeeding the predetermined number of bytes when the contents of the unescaped predetermined number of bytes includes the predetermined characters; and
      identifying when contents of the unescaped predetermined number of bytes and contents of additional consecutive bytes contain the configuration information of a predetermined type.

7. A system for early detection of configuration information of a predetermined type, the system including (i) a terminal device for transmitting and receiving a plurality of framed data packets, each of the framed data packets containing an information portion, and (ii) a communication device coupled to the terminal device, the communication device being operable to:
   detect a beginning of the information portion within one of the framed data packets to identify when the information portion contains the configuration information of a predetermined type; and unframe the one of the framed data packets when the information portion contains the configuration information of a predetermined type;
the detecting and unframing including:
scanning the plurality of the framed data packets and establishing the beginning of the information portion for one of the framed data packets by identifying a frame-demarcating character;
identifying when contents of a particular byte or bytes of the information portion contains information of a type associated with the particular byte or bytes;
identifying when the contents of the particular byte or bytes contain the configuration information of a predetermined type; and
progressing to a subsequent stage when the contents of the particular byte or bytes lacks the configuration information of a predetermined type and the configuration information of a predetermined type is disposed in a byte position subsequent to the particular byte or bytes.

8. The system of claim 7, wherein the progressing to a subsequent stage further includes,
examining contents of at least one succeeding byte of the information portion, the succeeding byte being subsequent to the particular byte;
identifying when contents of the succeeding byte contains information of a type associated with the succeeding byte and when the contents of the succeeding byte contain the configuration information of a predetermined type; and
sequentially examining successive bytes of the information portion until the contents of the succeeding byte contains the configuration information of a predetermined type.

9. The system of claim 8, wherein the contents of the particular byte and the contents of the succeeding byte include escaped information.

* * * * *